United States Patent
Kim (10) Patent No.: US 9,564,657 B2
(45) Date of Patent: Feb. 7, 2017

(54) ELECTROLYTE FOR RECHARGEABLE LITHIUM BATTERY, AND RECHARGEABLE LITHIUM BATTERY INCLUDING SAME

(71) Applicant: SAMSUNG SDI CO., LTD., Yongin-si, Gyeonggi-do (KR)

(72) Inventor: Seung-Mo Kim, Suwon-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 308 days.

(21) Appl. No.: 14/478,489

(22) Filed: Sep. 5, 2014

(65) Prior Publication Data
US 2015/0132664 A1    May 14, 2015

(30) Foreign Application Priority Data
Nov. 14, 2013    (KR) .................. 10-2013-0138558

(51) Int. Cl.
*H01M 10/0567* (2010.01)
*H01M 10/052* (2010.01)

(52) U.S. Cl.
CPC ....... *H01M 10/0567* (2013.01); *H01M 10/052* (2013.01); *H01M 2220/20* (2013.01); *H01M 2300/0025* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 6,783,896 B2 *    8/2004    Tsujioka ............... C07F 5/022
                                                              252/62.2

2012/0237836 A1    9/2012    Kim
2013/0288139 A1 *    10/2013    Choi .................. H01M 10/0564
                                                              429/338
2014/0193706 A1 *    7/2014    Morinaka ........ H01M 10/0567
                                                              429/200
2014/0272607 A1 *    9/2014    Amine ................ H01M 10/052
                                                              429/338

FOREIGN PATENT DOCUMENTS

| JP | 2013-020735 A | 1/2013 |
| KR | 10-2012-0104930 A | 9/2012 |
| KR | 10-2012-0132811 A | 12/2012 |

OTHER PUBLICATIONS

Sid Megahed et al., Lithium-ion rechargeable batteries, Journal of Power Sources, 51 (1994) 79-104.
Korean Notice of Allowance dated Sep. 26, 2016 in Corresponding Korean Patent Application No. 10-2013-0138558.

* cited by examiner

*Primary Examiner* — Alix Eggerding
(74) *Attorney, Agent, or Firm* — Lee & Morse, P.C.

(57) ABSTRACT

An electrolyte for a rechargeable lithium battery includes a lithium salt; a non-aqueous organic solvent; and an additive including a compound represented by the Chemical Formula 1,

[Chemical Formula 1]

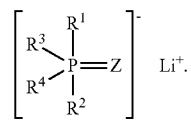

12 Claims, 5 Drawing Sheets

ELECTROLYTE FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2013-0138558, filed on Nov. 14, 2013, in the Korean Intellectual Property Office, and entitled: "ELECTROLYTE FOR RECHARGEABLE LITHIUM BATTERY, AND RECHARGEABLE LITHIUM BATTERY INCLUDING SAME," is incorporated by reference herein in its entirety.

BACKGROUND

1. Field

Embodiments relate to an electrolyte for a rechargeable lithium battery and a rechargeable lithium battery including the same.

2. Description of the Related Art

Rechargeable lithium batteries may have a high energy density and have been used as a power source for small portable electronic devices. Rechargeable lithium batteries may use an organic electrolyte and may have two times the discharge voltage, or more, of a battery using an alkaline aqueous solution.

SUMMARY

Embodiments are directed to an electrolyte for a rechargeable lithium battery including a lithium salt, a non-aqueous organic solvent, and an additive including a compound represented by the following Chemical Formula 1,

[Chemical Formula 1]

In Chemical Formula 1,

Z may be O, S, or NR (wherein R is a substituted or unsubstituted C1 to C5 alkyl group), $R^1$ and $R^2$ may independently be a hydrogen atom or a halogen atom, and $R^3$ and $R^4$ may be links to a substituent represented by the following Chemical Formula 2 to form a ring,

[Chemical Formula 2]

In Chemical Formula 2, $R^5$ and $R^6$ may independently be O or S,

X and Y may independently be a hydrogen atom or a halogen atom, and l and n may be integers of 0 or 1, and m may be an integer ranging from 0 to 5.

Z may be O, and m may be an integer of 0.

The compound represented by Chemical Formula 1 may be represented by the following Chemical Formula 3,

[Chemical Formula 3]

In Chemical Formula 3, $R^1$ and $R^2$ may independently be a hydrogen atom or a halogen atom.

The compound represented by Chemical Formula 3 may be included in an amount of about 0.1 wt % to about 10 wt % based on 100 wt % of the electrolyte.

The compound represented by Chemical Formula 3 may be included in an amount of about 0.5 wt % to about 1.5 wt % based on 100 wt % of the electrolyte.

The additive may be included in an amount of about 0.1 wt % to about 10 wt % based on 100 wt % of the electrolyte.

The additive may be included in an amount of about 0.5 wt % to about 1.5 wt % based on 100 wt % of the electrolyte.

The lithium salt may include $LiPF_6$, $LiBF_4$, $LiBF_6$, $LiSbF_6$, $LiAsF_6$, $LiSO_3CF_3$, $LiN(CF_3SO_2)_2$, $LiN(C_2F_5SO_2)_2$, $LiClO_4$, $LiAlO_4$, $LiAlCl_4$, or a combination thereof.

The non-aqueous organic solvent may include a linear carbonate compound, a cyclic carbonate compound, an ester-based compound, an ether-based compound, a ketone-based compound, or a combination thereof.

Embodiments are also directed to a rechargeable lithium battery including a positive electrode including a positive active material, a negative electrode including a negative active material, and an electrolyte according to an embodiment.

The positive active material may be lithium transition metal oxide represented by one of the following Chemical Formulae 4 to 6,

[Chemical Formula 4]

$Li_xMO_2$ (M is one or more transition metal, and $0 \leq x \leq 1$)

[Chemical Formula 5]

$Li_yM_2O_4$ (M is one or more transition metal, and $0 \leq y \leq 2$)

[Chemical Formula 6]

$xLi_2MnO_3 \cdot (1-x)LiMn_{2-y}M_yO_4$ (M is one or more transition metal, $0<x<1$, and $0 \leq y <1$)

The negative active material may include a carbon-based active material, a Si-based active material, or a combination thereof.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

As used herein, when a definition is not otherwise provided, the term "substituted" refers to one substituted with a C1 to C30 alkyl group; a C2 to C30 alkenyl group, a C2 to C30 alkynyl group, a C1 to C10 alkylsilyl group; a C3 to C30 cycloalkyl group; a C6 to C30 aryl group; a C1 to C30 heteroaryl group; a C1 to C10 alkoxy group; a silane group; an alkylsilane group; an alkoxysilane group; an amine group; an alkylamine group; an arylamine group; or a halogen, instead of hydrogen of a compound.

As used herein, when a definition is not otherwise provided, the term "alkyl group" may refer to "a saturated alkyl group" without any alkenyl group or alkynyl group; or "an unsaturated alkyl group" including at least one alkenyl group or alkynyl group. The "alkenyl group" may refer to a substituent having at least one carbon-carbon double bond of at least two carbons, and the "alkynyl group" may refer to a substituent having at least one carbon-carbon triple bond of at least two carbons. The alkyl group may be a branched, linear, or cyclic alkyl group.

According to an example embodiment, an electrolyte for a rechargeable lithium battery includes a lithium salt, a non-aqueous organic solvent, and an additive.

Additive

The additive may include a compound represented by the following Chemical Formula 1.

[Chemical Formula 1]

According to the present example embodiment, in the above Chemical Formula 1, Z is O (oxygen atom), S (sulfur atom), or NR (wherein R is a substituted or unsubstituted C1 to C5 alkyl group), $R^1$ and $R^2$ are independently a hydrogen atom or a halogen atom, and $R^3$ and $R^4$ are links to a substituent represented by the following Chemical Formula 2 to form a ring,

[Chemical Formula 2]

wherein, $R^5$ and $R^6$ are independently O (oxygen atom) or S,

X and Y are independently a hydrogen atom or a halogen atom, and l and n are integers of 0 or 1, and m is an integer ranging from 0 to 5.

In a rechargeable lithium battery including a compound represented by the above Chemical Formula 1 as an additive to an electrolyte, cycle-life and capacity characteristics may be improved.

In an example embodiment, Z may be O (oxygen atom), and m may be an integer of 0.

In an example embodiment, l and n may be integers of 1.

In an example embodiment, the additive may include a compound represented by the following Chemical Formula 3.

[Chemical Formula 3]

According to the present example embodiment, in the above Chemical Formula 3, $R^1$ and $R^2$ are independently a hydrogen atom or a halogen atom. For example, the $R^1$ and $R^2$ may be fluorine atoms (F).

When a rechargeable lithium battery is initially charged, a lithium ion formed through oxidization of lithium from lithium transition metal oxide of a positive electrode may be intercalated with carbon of a negative electrode. Without being bound by theory, it is believed that the lithium ion having strong reactivity reduces the electrolyte on the interface and forms a passivation film on the surface of the negative electrode (this passivation film is called a solid electrolyte interface (SEI)). The passivation film may play a role of blocking a reaction of the negative electrode with the electrolyte during the charge and discharge and simultaneously, passing only lithium ions from the positive electrode as an ion tunnel. Accordingly, the lithium ions may be solvated, and organic solvent molecules therein may be intercalated with carbon of the negative electrode and block structural collapse of the negative electrode. When the additive is included in the electrolyte, a film having a low resistance increase rate after charge and discharge cycles at room temperature and a high temperature may be formed on the surface of the negative electrode. According to an example embodiment, the additive includes an anion in which a hetero atom or halogen atom is coordinated with a phosphorus (P) atom, and a lithium cation. When this additive is added to an electrolyte, lithium ions may be reduced in a lower potential than the non-aqueous organic solvent, and thus a low resistance increase rate may be maintained after a cycle at room temperature and a high temperature. In addition, a side reaction between electrolyte and negative electrode may be minimized, and capacity retention may be improved.

According to an example embodiment, the additive may be included in an amount of about 0.1 wt % to about 10 wt %, for example about 0.5 wt % to about 1.5 wt %, based on 100 wt % of the electrolyte. A rechargeable lithium battery having the additive is included within the range may exhibit a low resistance increase rate after being subjected to charge and discharge cycles at room temperature and a high temperature and then allowed to stand at a high temperature. According to an example embodiment, the compound represented by Chemical Formula 1 or Chemical Formula 3 may be included in an amount of about 0.1 wt % to about 10 wt %, for example about 0.5 wt % to about 1.5 wt %, based on 100 wt % of the electrolyte.

Lithium Salt

According to the present example embodiment, the lithium salt is dissolved in the non-aqueous organic solvent (described below) and acts as a source of lithium ions in the battery, and may improve lithium ion transportation between positive and negative electrodes.

The lithium salt may include, e.g., $LiPF_6$, $LiBF_4$, $LiBF_6$, $LiSbF_6$, $LiAsF_6$, $LiSO_3CF_3$, $LiN(CF_3SO_2)_2$, $LiN(C_2F_5SO_2)_2$, $LiClO_4$, $LiAlO_4$, $LiAlCl_4$, or a combination thereof.

The lithium salt may be used in a concentration ranging from, e.g., about 0.1 M to about 2.0 M. When the lithium salt is included at the above concentration range, an electrolyte may have excellent performance and lithium ion mobility due to desirable levels of electrolyte conductivity and viscosity.

Non-Aqueous Organic Solvent

According to the present example embodiment, the non-aqueous organic solvent serves as a medium for transmitting ions taking part in the electrochemical reaction of a battery.

The non-aqueous organic solvent may include a linear carbonate compound, a cyclic carbonate compound, an ester-based compound, an ether-based compound, a ketone-based compound, or a combination thereof.

The linear carbonate compound may include diethyl carbonate (DEC), ethylmethyl carbonate (EMC), dimethyl carbonate (DMC), dipropyl carbonate (DPC), methylpropyl carbonate (MPC), ethylpropyl carbonate (EPC), methylethyl carbonate (MEC), or a combination thereof.

The cyclic carbonate compound may include ethylene carbonate (EC), propylene carbonate (PC), butylene carbonate (BC), fluoroethylene carbonate (FEC), vinylethylene carbonate (VEC), or a combination thereof.

When the linear carbonate compound and the cyclic carbonate compound are mixed with each other, the compounds may be used in an amount of about 60 wt % to about 40 wt %. When the linear carbonate compound and the cyclic carbonate compound are within the ratio ranges, a dielectric ratio of the electrolyte may be increased and a viscosity may be simultaneously decreased.

The ester-based compound may include methylacetate, ethylacetate, n-propylacetate, dimethylacetate, methylpropionate, ethylpropionate, methylbutyrate, ethylbutyrate, γ-butyrolactone, decanolide, valerolactone, mevalonolactone, caprolactone, or a combination thereof.

The ether-based compound may include dibutylether, tetraglyme, diglyme, dimethoxyethane, 2-methyltetrahydrofuran, tetrahydrofuran, or a combination thereof.

The ketone-based compound may include cyclohexanone, and the like.

The non-aqueous organic solvent may further include an alcohol-based compound, an aprotic solvent, and the like. The alcohol-based compound may be ethanol, isopropyl alcohol, and the like.

The non-aqueous organic solvent may be used singularly or in a mixture. When the organic solvent is used in a mixture, the mixture ratio may be determined in accordance with a desirable battery performance.

Hereinafter, a rechargeable lithium battery according to an example embodiment including an electrolyte according to an embodiment is described referring to FIG. 1.

Figure 1:
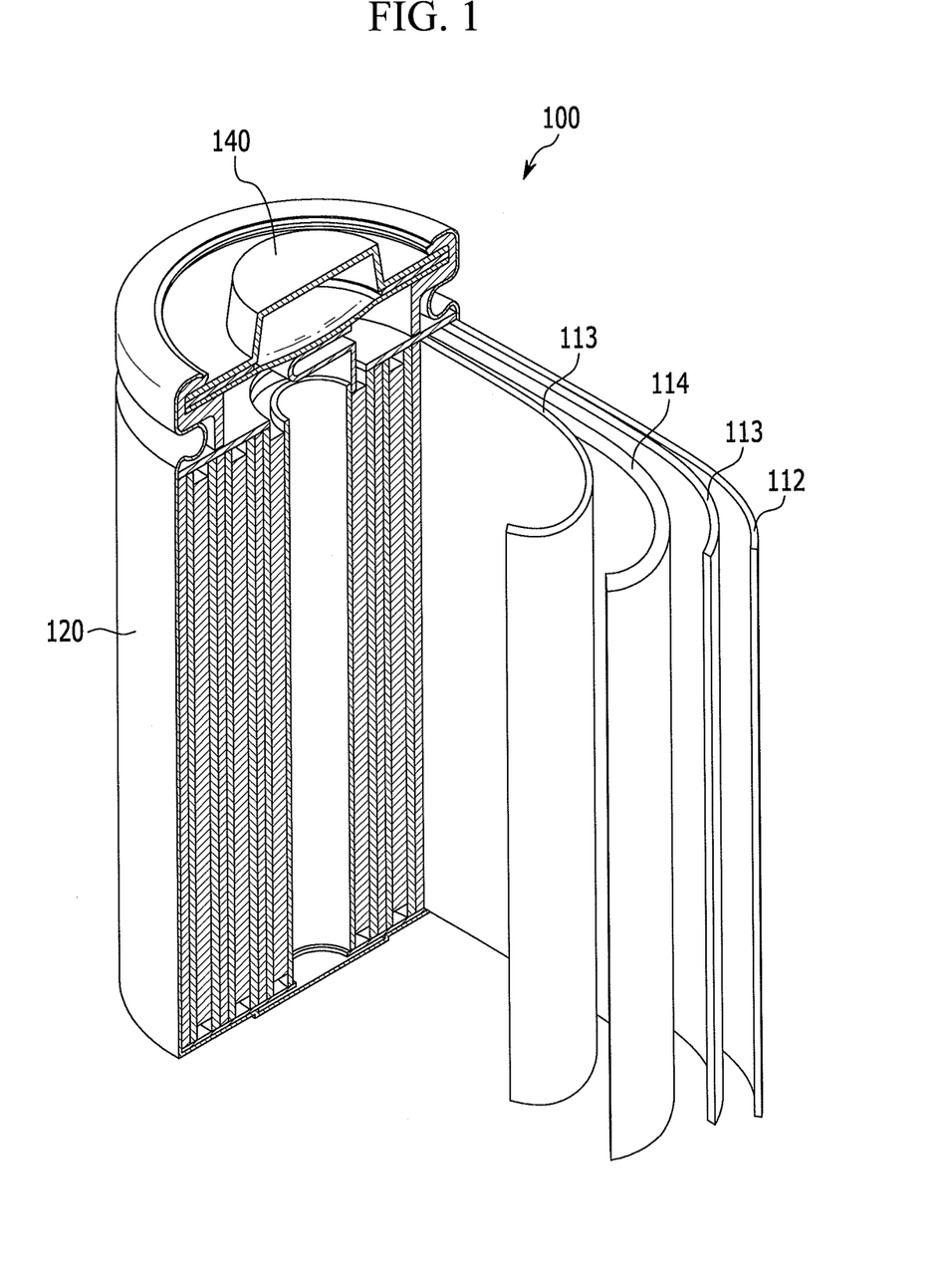
FIG. 1 illustrates a schematic view showing a rechargeable lithium battery according to an example embodiment.

FIG. 1 is a schematic view showing a rechargeable lithium battery according to an example embodiment.

In the example embodiment shown in FIG. 1, the rechargeable lithium battery 100 includes an electrode assembly including a positive electrode 114, a negative electrode 112 facing the positive electrode 114, a separator 113 between the positive electrode 114 and negative electrode 112, an electrolyte impregnating the positive electrode 114, negative electrode 112, and separator 113, a battery case 20 housing the electrode assembly, and a sealing member 140 sealing the battery case.

The positive electrode 114 may include a positive current collector and a positive active material layer on the positive current collector. The positive active material layer may include a positive active material, a binder, and selectively, a conductive material.

The positive current collector may be, e.g., Al.

The positive active material may be, e.g., at least one of lithium transition metal oxides represented by the following Chemical Formulae 4 to 6, or another suitable material for a positive active material of a rechargeable lithium battery.

[Chemical Formula 4]

$Li_xMO_2$ (M is one or more transition metal, specifically Ni, Co, Mn, Al, or a combination thereof, and $0 \leq x \leq 1$)

[Chemical Formula 5]

$Li_yM_2O_4$ (M is one or more transition metal, specifically Ni, Co, Mn, Al, or a combination thereof, and $0 \leq y \leq 2$)

[Chemical Formula 6]

$xLi_2MnO_3 \cdot (1-x)LiMn_{2-y}M_yO_4$ (M is one or more transition metal, specifically Ni, Co, Mn, Al, or a combination thereof, $0 < x < 1$, and $0 \leq y < 1$)

The binder may be used to improve binding properties of positive active material particles with one another and with a current collector. Specific examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc.

The conductive material may be used to improve conductivity of an electrode. A suitable electrically conductive material that does not cause a chemical change may be used as a conductive material. Examples thereof may be natural graphite, artificial graphite, carbon black, acetylene black, ketjen black, a carbon fiber, a metal powder, a metal fiber, and the like of copper, nickel, aluminum, silver, and the like, and a polyphenylene derivative and the like, which may be used singularly or as a mixture thereof.

The negative electrode 112 may include a negative current collector and a negative active material layer formed on the negative current collector.

The negative current collector may include a copper foil.

The negative active material layer may include a negative active material, a binder, and a conductive material.

The negative active material may be a carbon-based active material, a Si-based active material, a combination thereof, etc., or another suitable material for a negative active material of a rechargeable lithium battery.

The carbon-based active material may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The Si-based active material may be Si, $SiO_x$ ($0<x<2$), a Si—Y alloy (wherein Y is an element selected from an alkali metal, an alkaline-earth metal, Group 13 to 16 elements, a transition metal, a rare earth element and a combination thereof, and not Si), Sn, $SnO_2$, a Sn—Y (wherein Y is an element selected from an alkali metal, an alkaline-earth metal, Group 13 to 16 elements, a transition metal, a rare earth element, and a combination thereof, and not Sn), and the like. At least one of these materials may be mixed with SiO$_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The binder may be used to improve binding properties of negative active material particles with one another and with a current collector. The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof. When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

The conductive material may be used to improve conductivity of an electrode. A suitable electrically conductive material that does not cause a chemical change may be used as a conductive material. Examples thereof may be a carbon-based material such as natural graphite, artificial graphite, carbon black, acetylene black, ketjen black, a carbon fiber, and the like; a metal-based material such as a metal powder or a metal fiber of copper, nickel, aluminum, silver, and the like; a conductive polymer such as a polyphenylene derivative and the like; or a mixture thereof.

The negative electrode 112 and the positive electrode 114 may be manufactured by a method including mixing each active material, a conductive material, and a binder in a solvent into an active material composition and coating the composition on a current collector.

The electrode manufacturing method may be a general method. The solvent may include N-methylpyrrolidone, etc.

The separator 113 may be a single layer or a multilayer, and may be, for example made of polyethylene, polypropylene, polyvinylidene fluoride, or a combination thereof.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples Preparation of Electrolyte Example 1 and Comparative Examples 1 to 3

An electrolyte was prepared by mixing ethylene carbonate (EC), ethylmethyl carbonate (EMC), and dimethyl carbonate (DMC) in a volume ratio of 3:4:3, dissolving LiPF$_6$ in a concentration of 1.15 M, and adding additives given in the following Table 1 thereto. Herein, the additives were respectively in an amount of 1 wt % based on 100 wt % of the electrolyte.

TABLE 1

| | Additive |
|---|---|
| Example 1 |  |
| Comparative Example 1 | n/a |
| Comparative Example 2 |  |
| Comparative Example 3 |  |

(Manufacture of Rechargeable Lithium Battery Cell)

A positive active material layer composition was prepared by respectively mixing LiNi$_{0.5}$Co$_{0.2}$Mn$_{0.3}$O$_2$ as a positive active material, polyvinylidene fluoride (PVDF) as a binder, and carbon as a conductive material in a weight ratio of 86:9:5 and dispersing the mixture into N-methyl-2-pyrrolidone. The positive active material layer composition was coated on a 15 μm-thick aluminum foil and then dried and compressed, manufacturing a positive electrode.

A negative active material layer composition was prepared by mixing modified natural graphite as a negative active material with a binder and a thickener in a weight ratio of 98:1:1 in a water solvent. The negative active material layer composition was coated on a 10 μm-thick copper foil and then dried and compressed, manufacturing a negative electrode.

The positive and negative electrodes and a 25 μm-thick polyethylene separator were spirally wound and compressed, manufacturing a rechargeable lithium battery cell. Herein, the electrolytes according to Example 1 and Comparative Examples 1 to 3 were respectively used.

Experimental Example 1

Formation of SEI Film

Figure 2:
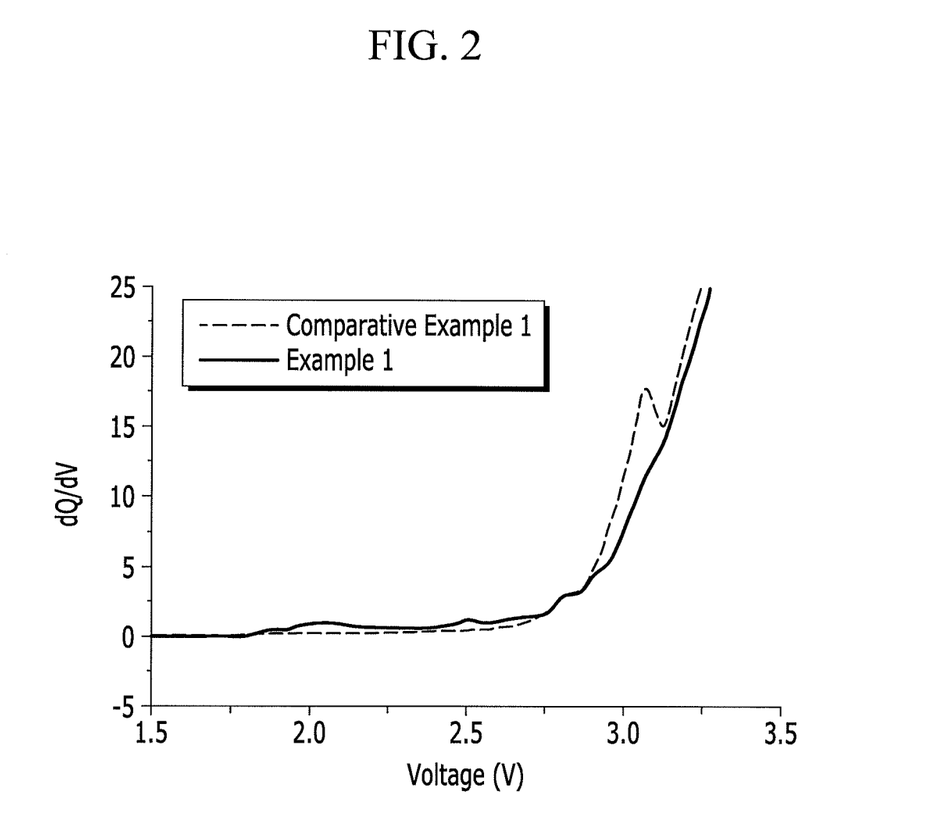
FIG. 2 illustrates a graph showing a differential capacity curved line of rechargeable lithium battery cells according to Example 1 and Comparative Example 1.

FIG. 2 is a graph showing a differential capacity curved line of the rechargeable lithium battery cells according to Example 1 and Comparative Example 1.

Referring to FIG. 2, without being bound by theory, it is believed that the rechargeable lithium battery cell according to Example 1 showed that an additive was decomposed at 2 V (a full cell voltage) and formed a SEI, whereas the rechargeable lithium battery cell according to Comparative Example 1 showed an EC decomposition peak at 3V, and accordingly, a SEI was not formed therein.

Experimental Example 2

Resistance Increase Rate when Allowed to Stand at High Temperature

Each rechargeable lithium battery cell according to Example 1 and Comparative Examples 1 to 3 were allowed to stand at 60° C. with a charged condition (SOC, state of charge=100%) for 30 days and then evaluated about a resistance increase rate when allowed to stand at a high temperature of 60° C. The results are provided in the following Table 2 and in FIG. 3.

Initial formation was performed by CC charging the rechargeable lithium battery cells at a current of 0.2 C up to 3.6 V and discharging them down to 2.8 V at the first cycle, CC charging them at 0.2 C of a current to 4.2 V and discharging them to 2.8 V at the second cycle to form an oxidation film on the surface of the electrodes.

Initial capacity and capacity after being allowed to stand for 30 days were measured by CC-CV charging rechargeable lithium battery cells at a current of 0.5 C to 4.2 V and then discharging at a current of 0.2 C to a cut-off voltage of 2.8 V.

A capacity retention (%) was calculated as a percentage of the capacity after being allowed to stand for 30 days based on the initial capacity.

Resistance was measured in the following method. A voltage was measured when a discharge current of 1 A was applied for 10 seconds at SOC of 50%, and DC-IR was calculated from R=V/I.

A resistance increase rate (%) was a percentage of the DC-IR when allowed to stand for 30 days relative to initial DC-IR.

TABLE 2

| | DC-IR increase rate after being allowed to stand at 60° C. for 30 days (%) |
|---|---|
| Example 1 | 104 |
| Comparative Example 1 | 120 |
| Comparative Example 2 | 104 |
| Comparative Example 3 | 105 |

Figure 3:
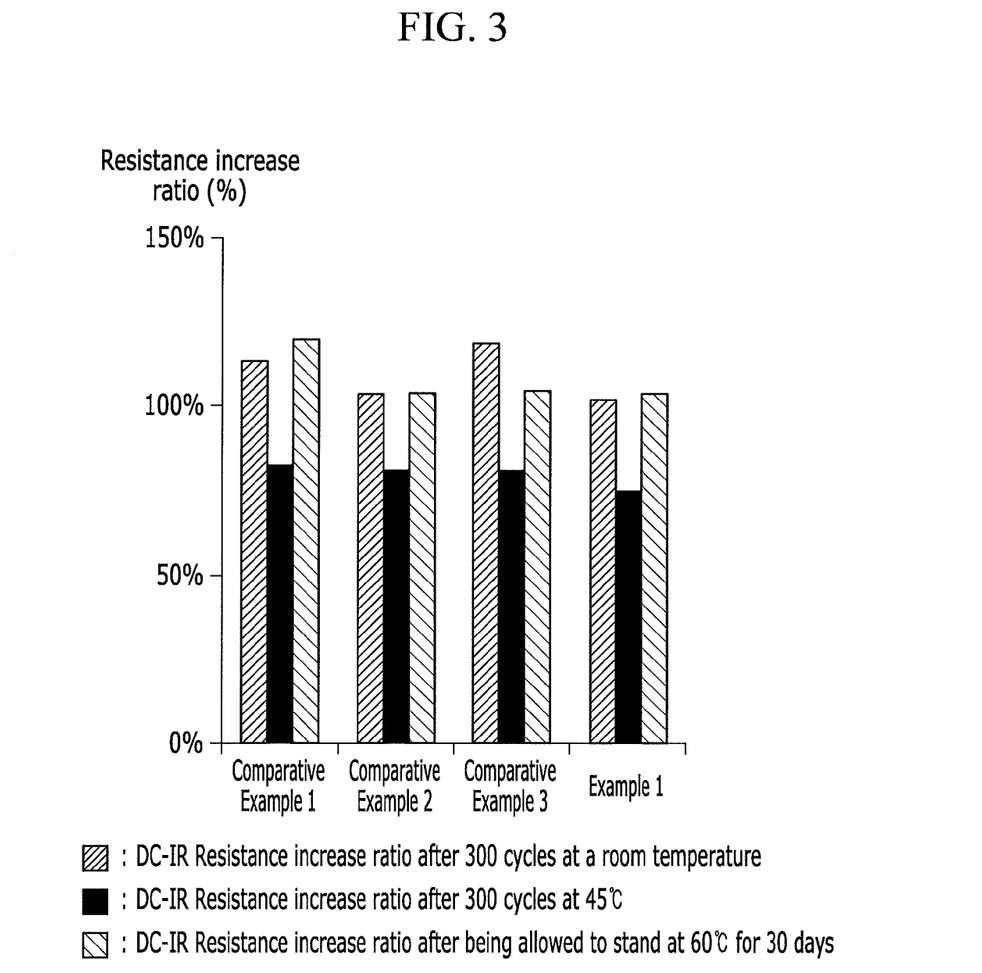
FIG. 3 illustrates a graph showing resistance increase rates of the rechargeable lithium battery cells according to Example 1 and Comparative Examples 1 to 3.

Referring to Table 2 and FIG. 3, Example 1 using an additive according to an embodiment showed a lower resistance increase rate than Comparative Examples 1 and 3 when allowed to stand at a high temperature of 60° C.

Experimental Example 3

Cycle-Life Characteristics at Room Temperature and High Temperature

Each rechargeable lithium battery cell according to Example 1 and Comparative Examples 1 to 3 was charged and discharged at room temperature 25° C. and a high temperature of 45° C. under a condition of 1 C/1 C. This charge and discharge were repeated 300 times, and resistance increase rate and capacity retention of the rechargeable lithium battery cells were measured depending on a cycle at room temperature of 25° C. and a high temperature of 45° C. The results are provided in the following Table 3 and in FIGS. 3 to 5.

TABLE 3

| | DC-IR increase rate after 1 C/1 C, 300 cycle at 25° C. (%) | DC-IR increase rate after 1 C/1 C 300 cycle at 45° C. (%) | 25° C., 1 C/1 C, 300 cycle capacity retention (%) | 45° C., 1 C/1 C, 300 cycle capacity retention (%) |
|---|---|---|---|---|
| Example 1 | 102 | 75 | 94 | 91 |
| Comparative Example 1 | 114 | 83 | 56 | 89 |
| Comparative Example 2 | 104 | 81 | 54 | 90 |
| Comparative Example 3 | 119 | 81 | 68 | 91 |

Figure 4:
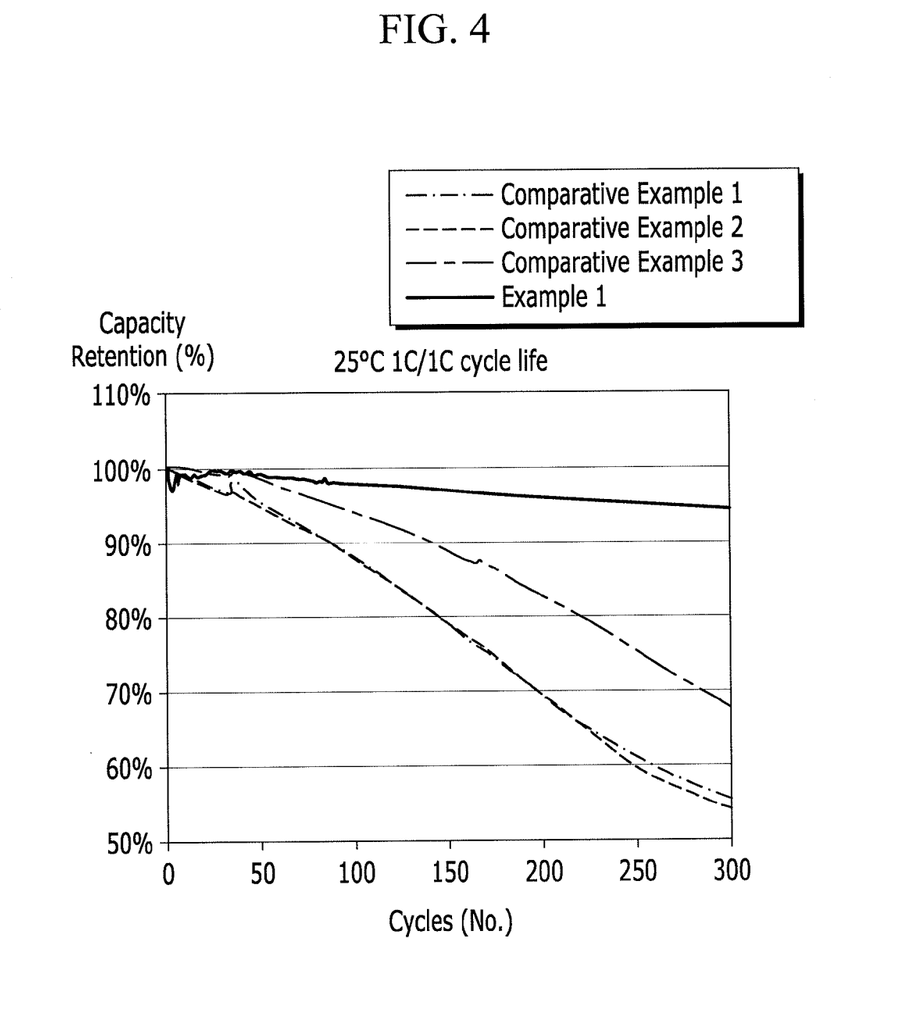
FIGS. 4 and 5 illustrate graphs showing capacity retention of the rechargeable lithium battery cells according to Example 1 and Comparative Examples 1 to 3.
Figure 5:
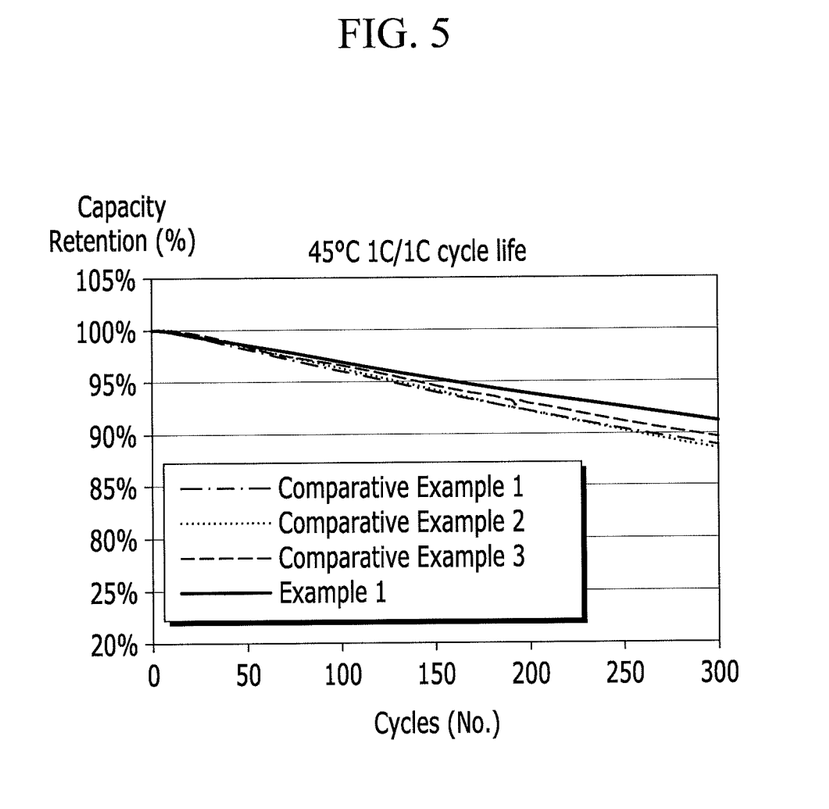

Referring to Table 3 and FIGS. 3 to 5, Example 1 using an additive according to an embodiment showed a lower resistance increase rate than Comparative Examples 1 to 3 during cycles at room temperature and a high temperature. In addition, Example 1 showed high capacity retention and thus excellent cycle-life characteristics compared with Comparative Examples 1 to 3.

By way of summation and review, manufacture of a rechargeable lithium battery may include injecting an electrolyte into an electrode assembly. The electrode assembly may include a positive electrode including a positive active material capable of intercalating/deintercalating lithium ions and a negative electrode including a negative active material capable of intercalating/deintercalating lithium ions.

The rechargeable lithium battery has been increasingly considered for a HEV (hybrid electric vehicle) and EV (electric vehicle) due to an increasing expectation for an environmentally-friendly electric vehicle. For an electric vehicle, the battery is desired to have a low resistance increase rate after charge and discharge cycles at room temperature and a high temperature. An additive forming a passivation film (a solid electrolyte interface, SEI) on the surface of a negative electrode may help provide a low resistance increase rate.

As described above, embodiments may provide an electrolyte for a rechargeable lithium battery having a low resistance increase rate after charge and discharge cycles at room temperature and high temperature and thus excellent capacity retention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
   a lithium salt;
   a non-aqueous organic solvent; and
   an additive including a compound represented by the following Chemical Formula 1,

[Chemical Formula 1]

wherein, in Chemical Formula 1,
Z is O, S, or NR (wherein R is a substituted or unsubstituted C1 to C5 alkyl group),
$R^1$ and $R^2$ are independently a hydrogen atom or a halogen atom, and
$R^3$ and $R^4$ are links to a substituent represented by the following Chemical Formula 2 to form a ring,

[Chemical Formula 2]

wherein, in Chemical Formula 2,
$R^5$ and $R^6$ are independently O or S,
X and Y are independently a hydrogen atom or a halogen atom, and
l and n are integers of 0 or 1, and m is an integer ranging from 0 to 5.

2. The electrolyte as claimed in claim 1, wherein:
the Z is O, and
the m is an integer of 0.

3. The electrolyte as claimed in claim 1, wherein the compound represented by Chemical Formula 1 is represented by the following Chemical Formula 3:

[Chemical Formula 3]

wherein,
$R^1$ and $R^2$ are independently a hydrogen atom or a halogen atom.

4. The electrolyte as claimed in claim 3, wherein the compound represented by Chemical Formula 3 is included in an amount of about 0.1 wt % to about 10 wt % based on 100 wt % of the electrolyte.

5. The electrolyte as claimed in claim 4, wherein the compound represented by Chemical Formula 3 is included in an amount of about 0.5 wt % to about 1.5 wt % based on 100 wt % of the electrolyte.

6. The electrolyte as claimed in claim 1, wherein the additive is included in an amount of about 0.1 wt % to about 10 wt % based on 100 wt % of the electrolyte.

7. The electrolyte as claimed in claim 6, wherein the additive is included in an amount of about 0.5 wt % to about 1.5 wt % based on 100 wt % of the electrolyte.

8. The electrolyte as claimed in claim 1, wherein the lithium salt includes $LiPF_6$, $LiBF_4$, $LiBF_6$, $LiSbF_6$, $LiAsF_6$, $LiSO_3CF_3$, $LiN(CF_3SO_2)_2$, $LiN(C_2F_5SO_2)_2$, $LiClO_4$, $LiAlO_4$, $LiAlCl_4$, or a combination thereof.

9. The electrolyte as claimed in claim 1, wherein the non-aqueous organic solvent includes a linear carbonate compound, a cyclic carbonate compound, an ester-based compound, an ether-based compound, a ketone-based compound, or a combination thereof.

10. A rechargeable lithium battery, comprising:
a positive electrode including a positive active material;
a negative electrode including a negative active material; and
the electrolyte as claimed in claim 1.

11. The rechargeable lithium battery as claimed in claim 10, wherein the positive active material is lithium transition metal oxide represented by one of the following Chemical Formulae 4 to 6:
[Chemical Formula 4]
$Li_xMO_2$ (M is one or more transition metals, and $0 \leq x \leq 1$)
[Chemical Formula 5]
$Li_yM_2O_4$ (M is one or more transition metals, and $0 \leq y \leq 2$)
[Chemical Formula 6]
$xLi_2MnO_3 \cdot (1-x)LiMn_{2-y}M_yO_4$ (M is one or more transition metals, $0<x<1$, and $0 \leq y<1$).

12. The rechargeable lithium battery as claimed in claim 10, wherein the negative active material includes a carbon-based active material, a Si-based active material, or a combination thereof.

* * * * *